United States Patent
Mattice et al.

(10) Patent No.: US 7,874,923 B2
(45) Date of Patent: Jan. 25, 2011

(54) MULTIPLE TOUCHSCREEN SENSORS ON A MONOLITHIC STRUCTURE

(75) Inventors: Harold Mattice, Gardnerville, NV (US); Chan Griswold, Reno, NV (US); Richard Wilder, Sparks, NV (US); James Stockdale, Clio, CA (US); Chris Gadda, Las Vegas, NV (US)

(73) Assignee: IGT, Reno, NV (US)

( * ) Notice: Subject to any disclaimer, the term of this patent is extended or adjusted under 35 U.S.C. 154(b) by 603 days.

(21) Appl. No.: 11/535,600

(22) Filed: Sep. 27, 2006

(65) Prior Publication Data

US 2008/0076581 A1    Mar. 27, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. ...................................................... 463/46
(58) Field of Classification Search .................. 463/16, 463/31, 34, 37, 46
See application file for complete search history.

(56) References Cited

U.S. PATENT DOCUMENTS

| | | | |
|---|---|---|---|
| 5,463,388 A * | 10/1995 | Boie et al. | 341/33 |
| 5,815,141 A * | 9/1998 | Phares | 345/173 |
| 6,088,069 A * | 7/2000 | Farlow | 349/12 |
| 6,163,313 A * | 12/2000 | Aroyan et al. | 345/173 |
| 6,280,552 B1 | 8/2001 | Bottari | |
| 6,379,569 B1 * | 4/2002 | Rouberol | 216/13 |
| 6,734,843 B2 | 5/2004 | Bertram et al. | |
| 6,838,013 B2 * | 1/2005 | Lennhoff et al. | 216/103 |
| 6,842,171 B2 * | 1/2005 | Richter et al. | 345/173 |
| 7,236,161 B2 * | 6/2007 | Geaghan et al. | 345/173 |
| 2001/0013681 A1 * | 8/2001 | Bruzzese et al. | 273/143 A |
| 2003/0050117 A1 | 3/2003 | Silva et al. | |
| 2003/0134095 A1 * | 7/2003 | Bottari et al. | 428/209 |
| 2004/0189587 A1 * | 9/2004 | Jung et al. | 345/102 |
| 2005/0049049 A1 | 3/2005 | Griswold et al. | |
| 2005/0206625 A1 | 9/2005 | Mattice et al. | |
| 2005/0206626 A1 | 9/2005 | Mattice et al. | |
| 2006/0068865 A1 * | 3/2006 | White et al. | 463/13 |
| 2007/0034423 A1 * | 2/2007 | Rebeschi et al. | 178/18.06 |
| 2009/0021489 A1 * | 1/2009 | Westerman et al. | 345/173 |

* cited by examiner

*Primary Examiner*—Pierre Eddy Elisca
*Assistant Examiner*—Reginald R. Renwick
(74) *Attorney, Agent, or Firm*—Armstrong Teasdale LLP

(57) ABSTRACT

Provided in embodiments of the present invention is a plurality of touchscreen arranged on a single monolithic structure of a multi-player gaming device. In one embodiment, a gaming device having a base structure and an upper structure arranged to define a layout of gaming stations each with a gaming display includes a substantially transparent monolithic substrate, an electrically conductive coating, and a protective layer. The monolithic substrate may be arranged over the upper structure to cover at least the plurality of gaming displays. The electrically conductive coating may be formed on the monolithic surface over at least the plurality of gaming displays such that conductive coating over each of the gaming displays is electrically isolated from the remainder of the conductive coating. The protective layer may be formed over the conductive coating and monolithic substrate and have a substantially planar surface.

22 Claims, 14 Drawing Sheets

MULTIPLE TOUCHSCREEN SENSORS ON A MONOLITHIC STRUCTURE

FIELD OF THE INVENTION

The present invention relates generally to multiple touchscreen sensors arranged on a monolithic structure, and more particularly to a plurality of touchscreens arranged on a single monolithic structure of a multi-player gaming device.

BACKGROUND

Although gaming has existed in some form for many years, its present familiar form of slot devices, table games, sports books, etc. has mainly developed in the last few decades. In gaming devices such as slot devices, video poker devices, and smart tables, one important device that has been developed to allow players to interact with the gaming device is the touchscreen. Touchscreens typically allow a user to write or draw information on a display screen or select among various regions of the display screen typically by the use of the user's finger or a stylus. This is desirable in gaming settings because a user or player may interact with a gaming device by selecting items or buttons displayed on a display screen or monitor.

Typically, when a gaming operation wants to provide a gaming device that can accommodate a plurality of players, it either has to link independent gaming devices together via a network or provide individual touchscreens at each gaming station at a smart table. Linking independent gaming devices is often less desirable because it is more difficult for players to interact if they are playing a multi-player game, such as "Texas Hold 'em" poker, and it requires more floor space, which is usually at a premium in casinos. Providing smart tables may eliminate some of these disadvantages, but also generates separate problems. One such problem is that it is expensive to design and manufacture smart tables that provide an adequately sized touchscreen monitor without compromising table space that may be used for other aspects of gaming. To compensate for these problems, these devices often must be increased in overall size, which again takes away from usable casino floor space.

Accordingly, it would be desirable to provide gaming devices with improved features to provide a gaming device structured to have adequately sized touchscreen displays without compromising table surface space.

Also, within a casino or other gaming environment, it is common for players to consume food and/or beverages on or around the gaming devices. Many casinos serve complimentary beverages to players at gaming devices in order to enhance the players' enjoyment and encourage further game play. However, consumption of food and beverages on and around gaming devices can be inconvenient for both the players and the casinos. For instance, players may not have a level and conveniently accessible surface upon which to place their food and beverage items. Furthermore, when food or beverage products are spilled on the gaming devices, the gaming devices can malfunction or require significant clean-up, resulting in downtime and possibly special servicing. Specifically, if food or beverages fall within input/output devices or other areas of the gaming device that lead to electrical or mechanical components, such contamination can cause the electrical or mechanical components to malfunction or operate in a less than optimal manner.

Traditionally, gaming devices have been designed as upright devices with displays positioned generally vertical or as inclined devices with displays tilted about 45 degrees from the horizontal. Both of these designs have facilitated viewing by players, but the upright devices make consumption of food or beverages by players difficult. Typically, food or beverage items are placed between devices or on nearby chairs. The inclined devices often have a horizontal platform in front of the tilted display where a player can place food or beverages. However, this horizontal area often includes a coin tray or other input/output devices, which can be contaminated by spilled food or beverages. One way that gaming devices have been designed to accommodate this problem has been to include drains or drain buckets. For instance, one or more drains can be placed at the bottom of the coin tray or at the base of the horizontal area. However, such solutions still require significant cleaning and maintenance by casino and gaming device personnel.

Thus, it would be desirable to provide gaming devices with improved features to also accommodate food and beverage consumption on or around the improved gaming devices.

These and other problems in conventional gaming devices are addressed by embodiments of the present invention.

SUMMARY

Embodiments of the present invention provide a plurality of touchscreen arranged on a single monolithic structure of a multi-player gaming device. In one embodiment, a gaming device includes a base structure and an upper structure mounted on the base structure and arranged to define a layout of gaming stations. A plurality of gaming displays may be respectively disposed at each of the gaming stations and a substantially transparent monolithic substrate may be arranged over the upper structure to cover at least the plurality of gaming displays. An electrically conductive coating may be formed on the monolithic surface over at least the plurality of gaming displays such that conductive coating over each of the gaming displays is electrically isolated from the remainder of the conductive coating. A protective layer may further be formed over the conductive coating and monolithic substrate and have a substantially planar surface.

DETAILED DESCRIPTION

Figure 1A:
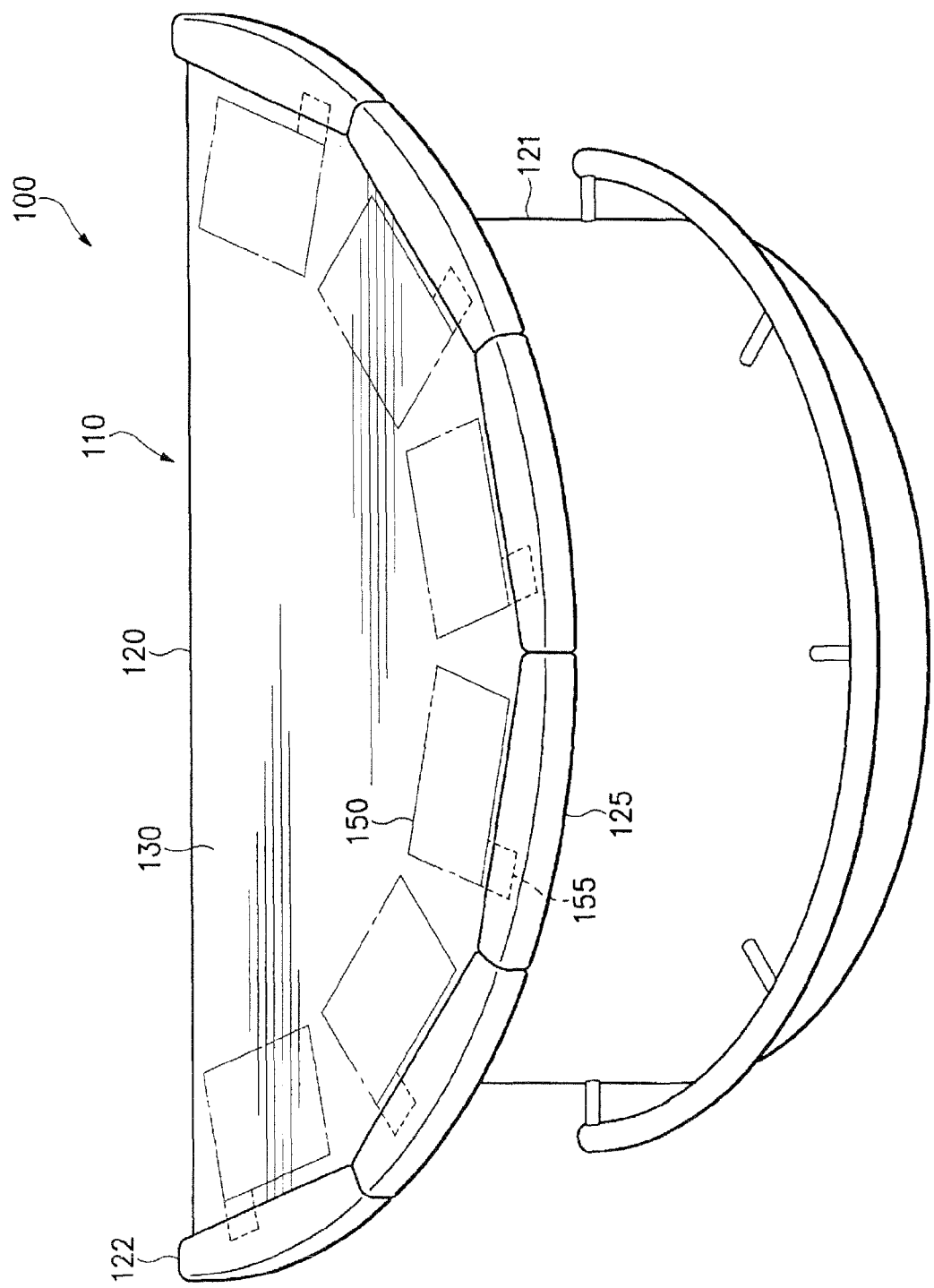
FIG. 1A illustrates an isometric view of a multi-player gaming device according to an embodiment of the present invention.

To address the problems discussed above and other problems, embodiments of the present invention are directed to a plurality of touchscreens arranged on a single monolithic surface of a multi-player gaming device. Some of these embodiments are described below in detail, and in addition, some specific details are shown for purposes of illustrating the inventive principles. However, numerous other arrangements may be devised in accordance with the inventive principles of this patent disclosure. Thus, while the present invention is described in conjunction with the specific embodiments illustrated in the drawings, it is not limited to these embodiments or drawings. Rather, it is intended to cover alternatives, modifications, and equivalents that come within the scope and spirit of the inventive principles set out in the appended claims. Further, well known processes have not been described in detail in order not to obscure the present invention. Thus, the inventive principles are not limited to the specific details disclosed herein.

Figure 1B:
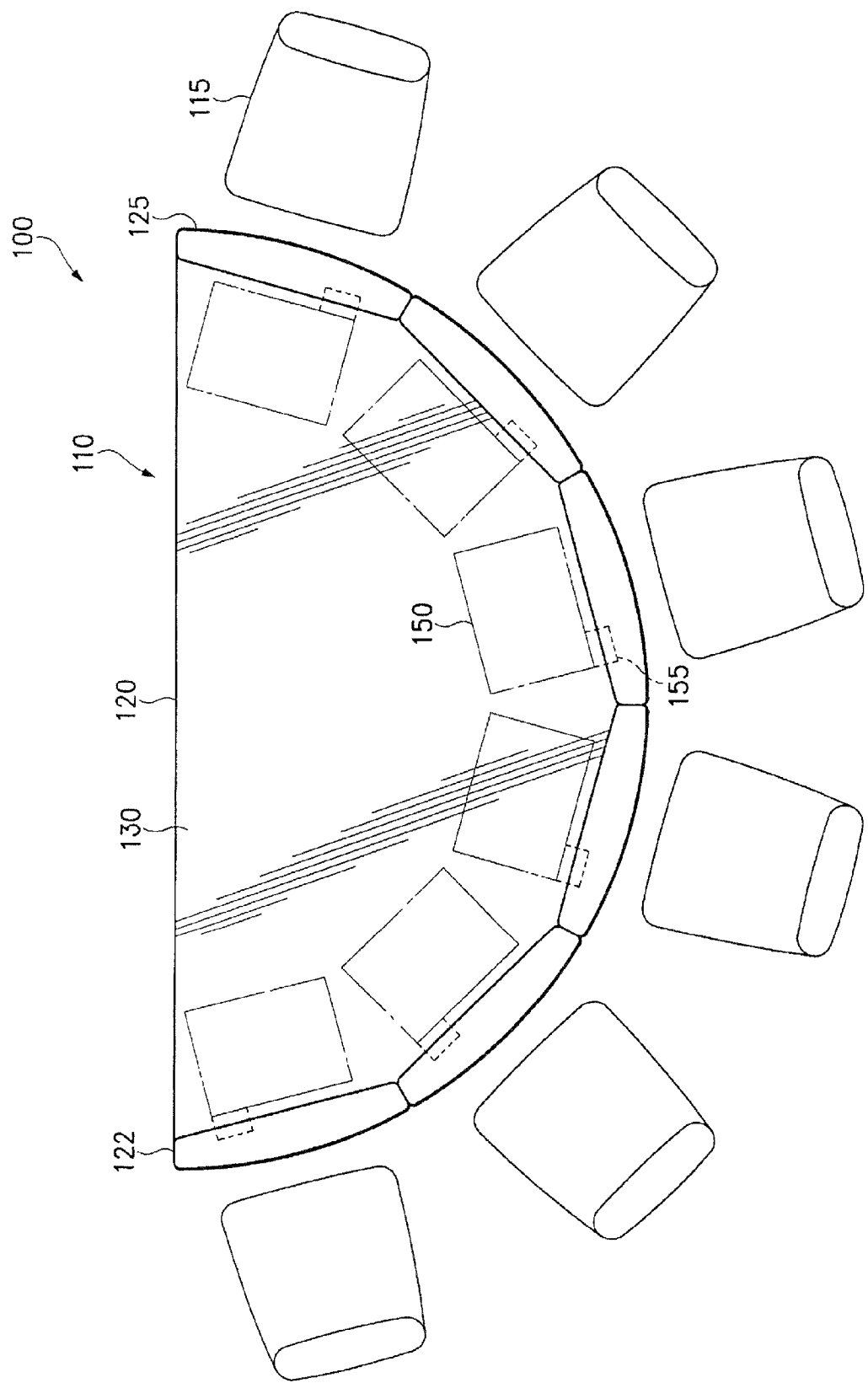
FIG. 1B illustrates a plan view of the multi-player gaming device illustrated in FIG. 1A.
Figure 1C:
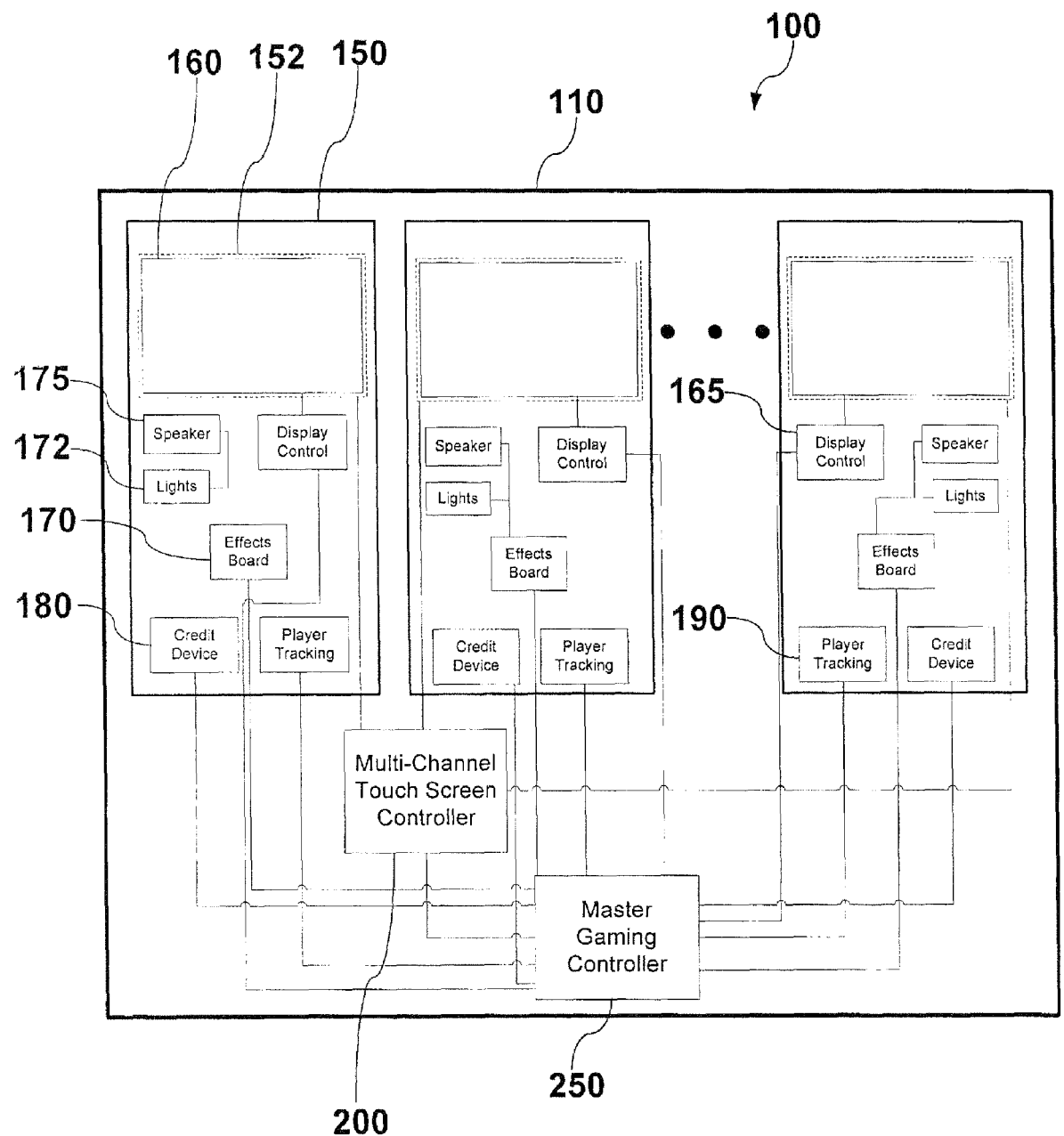
FIG. 1C illustrates a block diagram of the multi-player gaming device illustrated in FIG. 1A.

FIGS. 1A-1C illustrate a multi-player gaming device according to an embodiment of the present invention. More specifically, FIG. 1A illustrates an isometric view of a multi-player gaming device according to an embodiment of the present invention, FIG. 1B illustrates a plan view of the multi-player gaming device illustrated in FIG. 1A, and FIG. 1C illustrates a block diagram of the multi-player gaming device illustrated in FIG. 1A.

Referring to FIGS. 1A-1C, a gaming device 110 of gaming system 100 includes a base structure 121 and an upper structure 120 that is mounted on the base structure 121. The base structure 121 may be any type of structure capable of supporting the upper structure 120. In some embodiments, the base structure may feature ornate or artistic designs that match the décor of a casino or gaming facility, while other embodiments may include a more reserved functional design that may include a foot bar.

The upper structure 120 of the gaming device 121 may be arranged to define a layout of gaming stations 150. Although the embodiment of the present invention illustrated in FIGS. 1A and 1B depict six gaming stations 150, more or less gaming stations are possible. The upper structure 120 may be a tabletop style structure such as the substantially semi-circular gaming device 110 illustrated in FIGS. 1A and 1B. However, the upper structure may be formed in a variety of shapes and styles and is not limited to the structure shown in these embodiments. For example, although not pictured, the gaming device 110 may be part of a bar counter or dining table, where the gaming stations 150 are arranged to match the shape or function of these structures.

Referring again to FIGS. 1A-1C, each gaming station 150 may include a gaming display 160, a player tracking input device 190, a credit input/output device 180, and other mechanical input devices (not shown) such as buttons. The player tracking device 190 may include a player tracking card reader, an electronic pad to read a chip imbedded in a player card or other player-identifying card, a biometric reader device, or any other device used to identify a player and track their game play information. The credit input/output device 180 may include a bill or ticket reader, a coin acceptor, a ticket printer, or other types of devices that allow a player to initiate, buy, or transfer credits to a machine as well as receive or cash-out credits back from the machine.

In addition, each gaming station 150 may include other output devices besides the gaming display 160, such as lights 172 and speakers 175 to attract players or emphasize wins. These peripheral devices may be controlled by an effects board 170 to coordinate lighting and sound dependent on a particular gaming situation or mode. In addition, the gaming display screen 160 may be controlled by a display control circuit 165.

The player tracking device 190, the credit input/output device 180, the effects board, the display control circuit, and other peripheral devices may be connected to and at least partially controlled by a master gaming controller 250. The master gaming controller 250 may further be connected to each of the gaming stations 150, and may therefore help control all of the gaming stations 150 on a particular gaming device 10. Although the master gaming controller 250 is illustrated as being located within the gaming device 110 in FIG. 1C, it may be located on a remote server and connected to the gaming stations 150 by means of a communication network (such as the one shown in FIG. 5) in other embodiments. However, in other embodiments, each gaming station 150 may be connected to an individual game controller that is dedicated to that particular game station 150. In some of these embodiments, the individual game controllers may be networked together within the gaming device 150 or may be similarly linked to a central server outside the gaming device 110.

Figure 2:
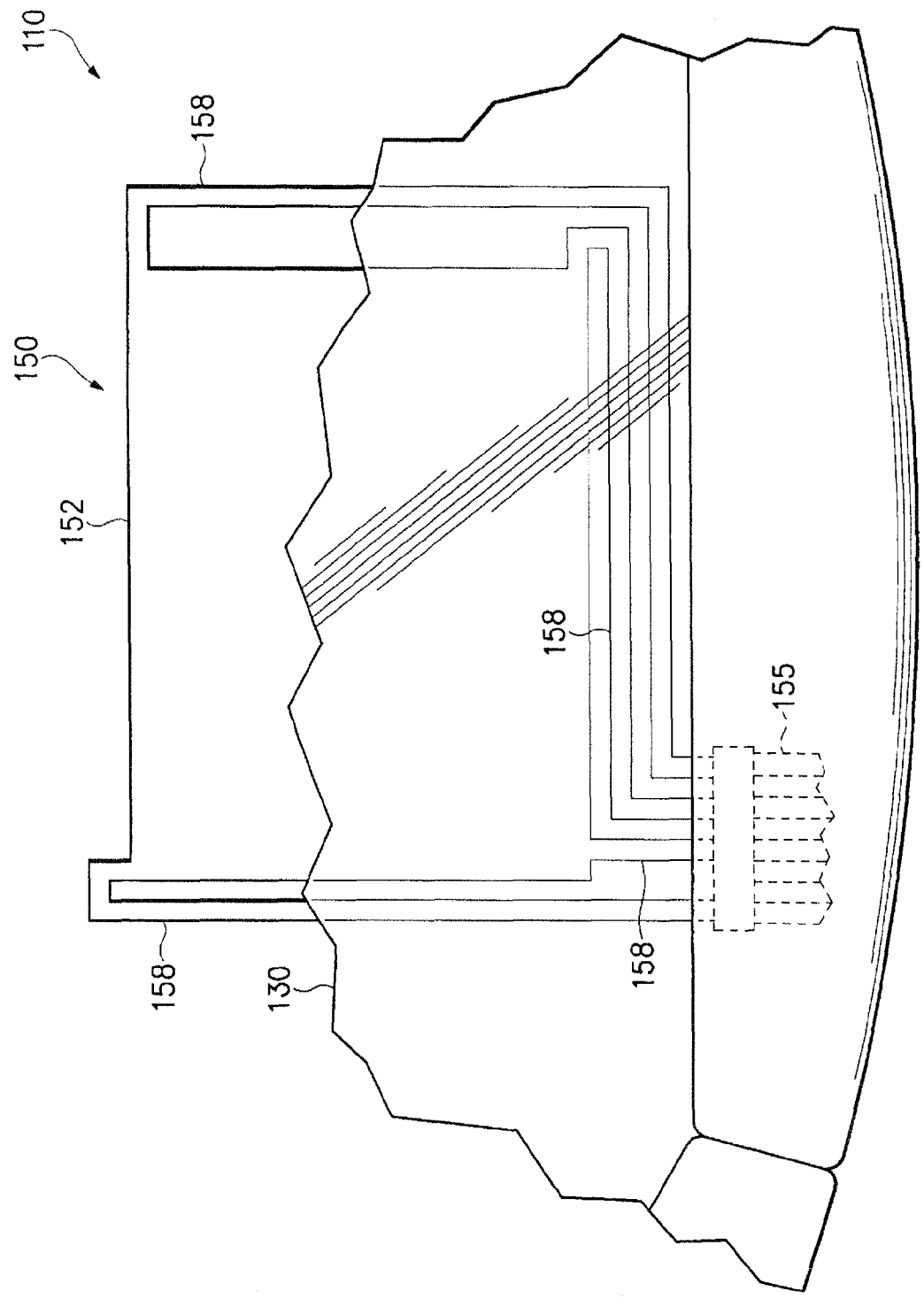
FIG. 2 illustrates a plan view of an example gaming station according to the embodiment illustrated in FIGS. 1A-1C.
Figure 3:
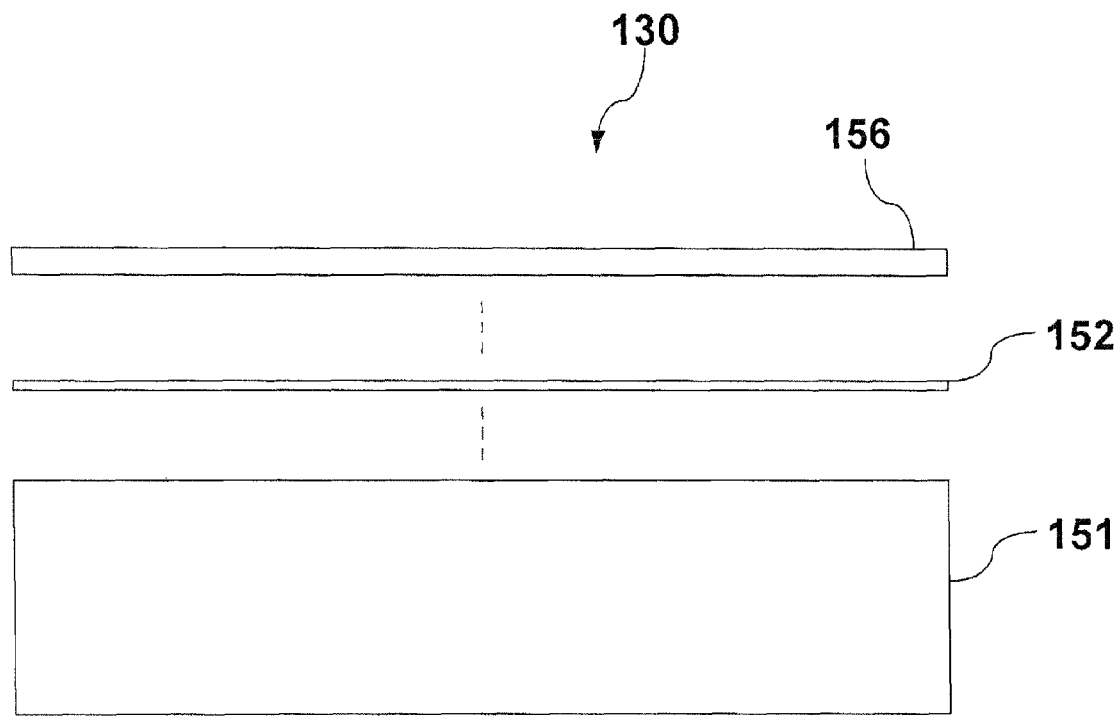
FIG. 3 illustrates an exploded cut-away view of the example gaming station illustrated in FIG. 2.

As shown in FIGS. 1A and 1B, the gaming stations 150 are covered by a substantially transparent monolithic structure 130. In the embodiments shown in FIGS. 1A and 1B, the monolithic structure 130 is formed to cover most of the upper structure 120. However, in other embodiments, the monolithic structure 130 may cover little else besides the gaming display screens 160 at each of the gaming stations 150. Embedded within the monolithic structure 130 are individual touchscreens formed over the gaming display screens 160 that are electrically isolated from each other. FIGS. 2 and 3 illustrate additional details about each of the gaming stations 150 and the monolithic structure 130 shown in FIGS. 1A-1C.

More specifically, FIG. 2 illustrates a plan view of an example gaming station according to the embodiment illustrated in FIGS. 1A-1C and FIG. 3 illustrates an exploded cut-away view of the example gaming station illustrated in FIG. 2.

Referring to FIGS. 1A-1C, 2, and 3, the monolithic structure includes a substantially transparent monolithic substrate 151, an electrically conductive coating 152 formed on the monolithic substrate 151, and a protective layer 156 formed over the conductive coating 152 and monolithic substrate 151. The conductive coating 152 may be etched so that it substantially covers each of the gaming display screens 160 at each of the gaming stations 150 as shown in FIG. 1C. Additionally, the conductive coating may be etched to form a plurality of touchscreen sensors 158. The touchscreen sensors 158 may be used to determine the location or coordinates of an input touch on the conductive coating touchscreen 152 that overlies a gaming display screen 160. The touchscreen sensors 158 may include unetched portions of the conductive coating connected to the portion of the conductive coating 152 overlying the gaming display screen 160. In such an embodiment, the touchscreen sensors 158 may act in a similar manner to electrical traces, where each touchscreen sensor trace 158 is of a known length and width. These touchscreen sensors 158 may be directed to an outside edge 122 of the gaming device 110, and connected to a flat ribbon wire 155 or other connection means to connect the touchscreen sensors to a touch screen controller 200. Examples of other connection means may include connection cables or individual wires. As shown in FIG. 1C, the gaming device 110 may include a single multi-channel touch screen controller 200 that controls each of the touchscreens at each gaming station 150 of a gaming device 110. However, in other embodiments, each conductive coating touchscreen 152 may be connected through touchscreen sensors 158 to individual touchscreen controllers 200 associated individually with each gaming station touchscreen 150. The touchscreen controllers 200 will be discussed in more detail below with reference to FIG. 4.

Referring back to FIGS. 1A-1C and 2, the flat ribbon wire 155 may be located at the outside edge 122 of the gaming device, and may be covered by player cushions 125 located on the outside edge 122 of the gaming device 110. The cushions 125 may serve to help hold the monolithic structure 130 in place as well as provide player comfort by protecting a player's arms from hard or sharp edges of the monolithic structure 130. Additionally, for aesthetic purposes, the cushions 125 may hide the edge of the monolithic structure 130 where the touchscreen traces 158 are linked to the flat ribbon wire 155.

The monolithic substrate 151 may include a substantially transparent single piece of glass. Preferably, the single piece of glass is optically clear as the better the transparency of the monolithic substrate 151, the clearer the images will be from the gaming display screen 160. In addition, the monolithic substrate may preferably be about 0.125 inches to 0.5 inches thick to provide adequate rigidity and durability. The conductive coating 152 for the touchscreens may be a substantially transparent conductive material such as indium tin oxide or tin antimony oxide. Again, a material with high transparency is preferable because of the desire to have clear images available from the gaming display screen 160. The conductive coating 152 may also preferably have a surface resistance of about 200 to about 2000 ohms per square to provide a sufficient medium to act as an electrode in a capacitive touchscreen.

The protective layer 156 may include a substantially transparent rigid material such as silicon dioxide or a hard polymer. The protective layer 156 may preferably be formed to have a continuous planar surface, as illustrated in FIGS. 1A and 1B. Additionally, the protective layer 156 may be sealed at the edges of the monolithic structure 130 so that liquids and air do not interfere with the operation of the gaming station touchscreens 150. Also, as the protective layer 156 has a continuous planar upper surface, it may prevent food or liquids from damaging the gaming display 160 or gaming electronics. Because the monolithic structure 130 of these embodiments includes a substantially rigid and durable monolithic substrate 151, as well as having no moving parts or layers, it may withstand the rigors and abuses of being used as a gaming table, as well as a place for a player to put glass bottles, plates, and large drink mugs. Additionally, because the touchscreens of the gaming device 110 are all integrated in a single planer monolithic structure 130, food, beverages, or other player articles may be placed directly on the table and even on the touchscreens without the need to worry about spilled fluids or food crumbs. Also, the gaming device 110 may require less casino floor space because the tabletop space of the monolithic structure 130 need not be as large as conventional smart tables, which may provide additional areas for player food and drinks.

The operation of the touchscreen in these embodiments is based on capacitive touchscreen principles. That is, the conductive coating 152 is supplied with a small voltage and acts as a first electrode of a capacitor. The protective layer 156 is an insulating material and acts as the dielectric layer of the capacitor. When a player touches a portion of the protective layer 156, the player's finger acts as the second electrode of the capacitor and a small amount of current is passed from the conductive layer 152 to the player's finger. The touchscreen sensors 158 in turn can detect by triangulation or other means which portion of the conductive layer is transmitting current and thus can allow a touchscreen controller 200 to calculate the coordinates of the touch. By knowing the coordinates of a touch, the touchscreen controller 200 can associate the particular coordinates with known coordinates of particular images shown on the screen. Therefore, if the player is touching a soft button shown on the screen with known coordinates, the touchscreen controller can determine the location of the touch and instruct the game processor to perform an action associated with the soft button such as cashing out or displaying a help screen on the gaming display screen 160. In addition, touchscreens are more preferable than fixed touch buttons found in some conventional devices because touchscreens allow for flexible backgrounds and active touching regions. Touch buttons, on the other hand, generally correspond to a fixed portion of the screen that is not altered during game play (such as a touch button for "Spin," "Cash Out," etc.

The gaming device 110 of the gaming system 100 may provide individual games at each of its gaming stations 150. In some embodiments, these games may be tied to individual fixed gaming controllers, where a change in game requires the substitution of a gaining processor by a slot technician. Thus, in these cases, each gaming station 150 may have a particular game associated with it, where a game processor for running the game is located locally in the gaming device 110. In other embodiments, each gaming station 150 may act as a terminal for a multi-game master controller 250. In these embodiments, the gaming processor may provide a variety of games to each gaming station, where the games may be similar or different. The multi-game master controller 250 may further be located either locally within the gaming device 110 or remotely on a server and connected through a network. In these cases, a player may select a type of slot or card game to wager on by selecting a game at the outset of wagering. As a player's preferred list of games may be stored in a player tracking account, a list of preferred games may be presented to a player upon recognition of a player tracking card or means by the player tracking device 190.

In still other embodiments, the gaming stations 150 of the gaming device 110 may be linked together for multi-player games such as "Texas Hold 'em" poker or blackjack. In this case, players at each gaming station 150 can participate in the same game. Additionally, other gaming devices (not shown) may be connected to a particular gaming device 110 through a gaming network (such as the one shown in FIG. 5) so that additional players may participate in a single game or gaming mode. This may be advantageous in a large slot or poker tournament, where particular events on other gaming devices 110 may affect game play on the particular gaming device 110 such as where a particular spin or bet number triggers bonus credits.

Figure 4:
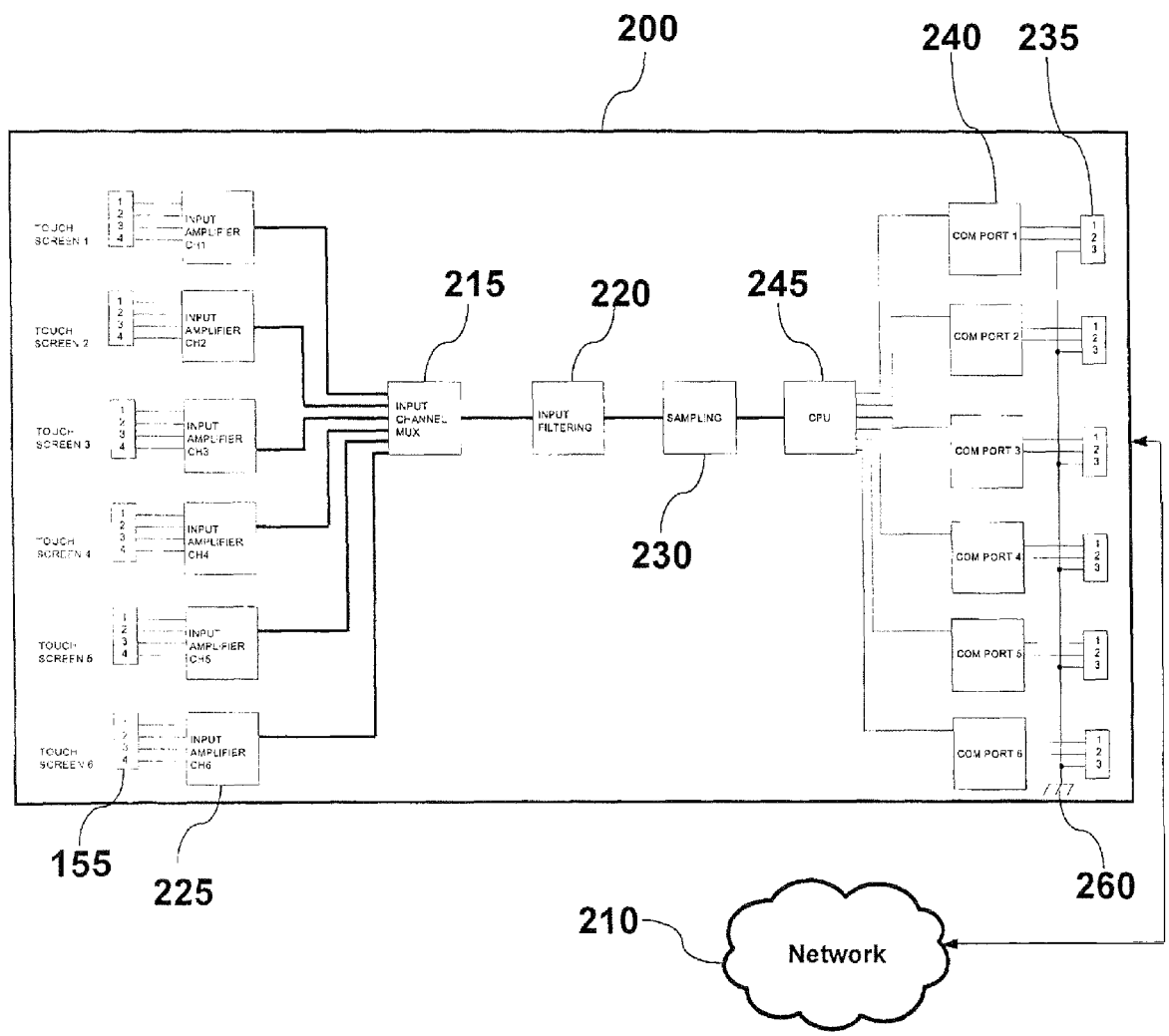
FIG. 4 illustrates a block diagram of a multi-channel touchscreen controller of the example gaming station illustrated in FIG. 1C.

FIG. 4 illustrates a block diagram of a multi-channel touchscreen controller of the example gaming station illustrated in FIG. 1A. Referring to FIG. 4, a multi-touchscreen controller 200 may include a plurality of input channel amplifiers 225 to amplify the signals coming from each of the touchscreen sensors 158 connected through the flat ribbon wire 115. The input channel amplifiers 225 may be connected to an input channel multiplexer 215 to select which of the gaming station touchscreens 150 is transmitting touch information. Although not shown, some embodiments of the multi-channel touchscreen controller 200 may have a queue or other means of handling substantially simultaneous inputs.

The multi-channel touchscreen controller 200 may also include an input filter 220 and a sampling circuit 230, which may be sequentially connected to the input channel multiplexer 215, to further format the input signals. A central processing unit (CPU) 245 may also be included in the multi-channel touchscreen controller 200 to process the inputted data. The CPU 245 may be connected to the input filter 220 and sampling circuit 230 so that data is received in optimized format for processing. The CPU 245 may further be connected to a plurality of communication ports 240 and output circuit ports 235 to communicate to the master gaming controller 250 (shown in FIG. 1C) or other devices to relay the appropriate processed information associated with an input touch. Additionally, the output circuit ports 235 may be tied to ground 160 so that only one output circuit port 235 is activated at a given time. The multi-channel touchscreen controller may also be connected to a remote server (not shown) through a network 210 so that bonus wins or other features associated with a particular input touch can be recorded. Further details about additionally circuitry that may be included in some embodiments to promote the operation of each touchscreen may be found in U.S. Pat. No. 6,734,843 to Bertram et al.

Figure 5:
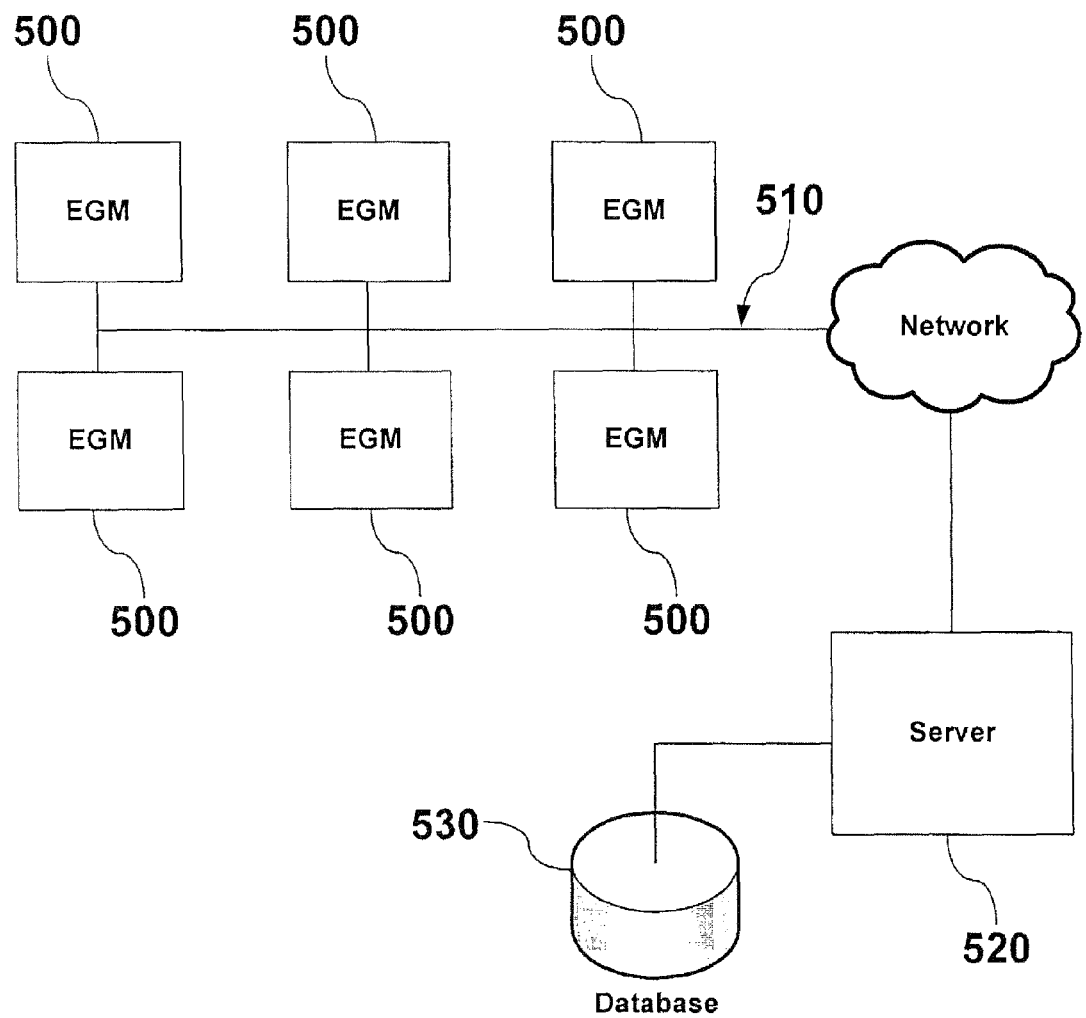
FIG. 5 illustrates a block diagram of networked gaming devices according to an embodiment of the present invention.

FIG. 5 illustrates a block diagram of networked gaming devices according to an embodiment of the present invention. Referring to FIG. 5, multiple electronic gaming devices (EGM) 500 may be connected together and connected to a remote server 520 via a network 510. Additionally, the gaming server 520 may be connected to one or more gaming databases 530. These gaming network 510 connections may allow multiple gaming devices 500 to remain in contact during particular gaming modes such as tournament play or remote head to head play. Although some of the gaming devices 500 connected on the gaming network 510 may resemble the gaming devices 110 shown in FIGS. 1A-1B, other connected gaming devices 500 may include traditional slot machines, wireless handheld gaming machines, cell phones, etc. Therefore, while some of the gaming devices 500 connected to the gaming network 510 may have multiple gaming stations, other gaming devices 500 connected to the same gaming network 510 may only have one gaming station.

As mentioned above, each game station 150 (shown in FIGS. 1A-1C) of the gaming devices 500 may have individual game controllers or the gaming stations 150 may be connected together through a master gaming controller (as shown in FIG. 1C) within a gaming device 500. Here, the individual game controllers and/or the multi-game controllers at a single gaming device 500 may be connected to a central server based game controller for operation of a server based game such as BINGO or keno, where gaming stations at the gaming devices 500 may act as gaming terminals.

In some embodiments, the network 510, server 520, and database 530 may be dedicated to communications regarding specific game or tournament play. However, in other embodiments, the network 510, server 520, and database 530 may be part of another existing system such as a player tracking network, server, and database. Additionally, a separate database 530 or server 520 may be connected to a common network 510 that can transmit both game/tournament data and player tracking data.

Figure 6:
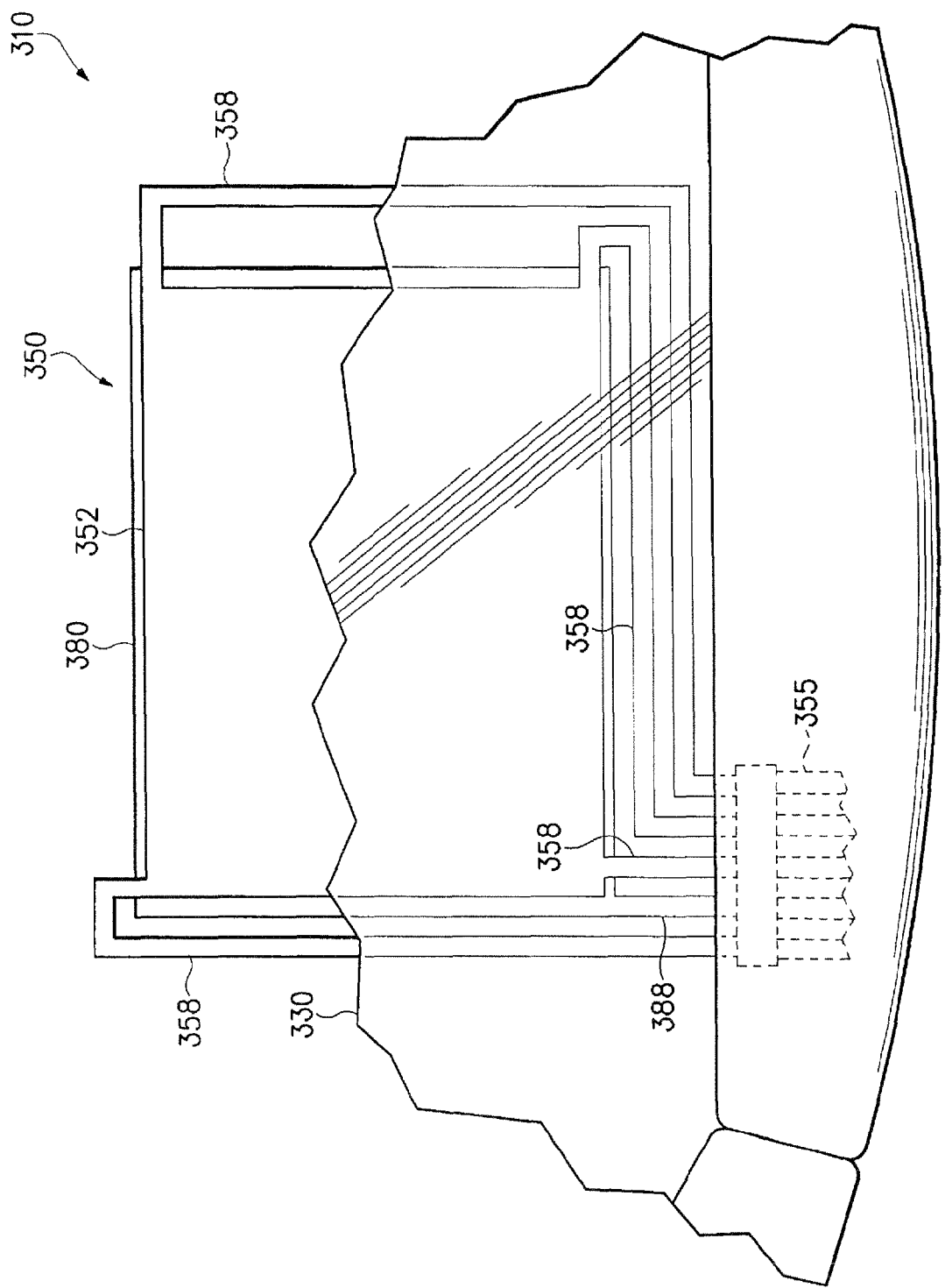
FIG. 6 illustrates a plan view of another example gaming station according to another embodiment of the present invention.
Figure 7:
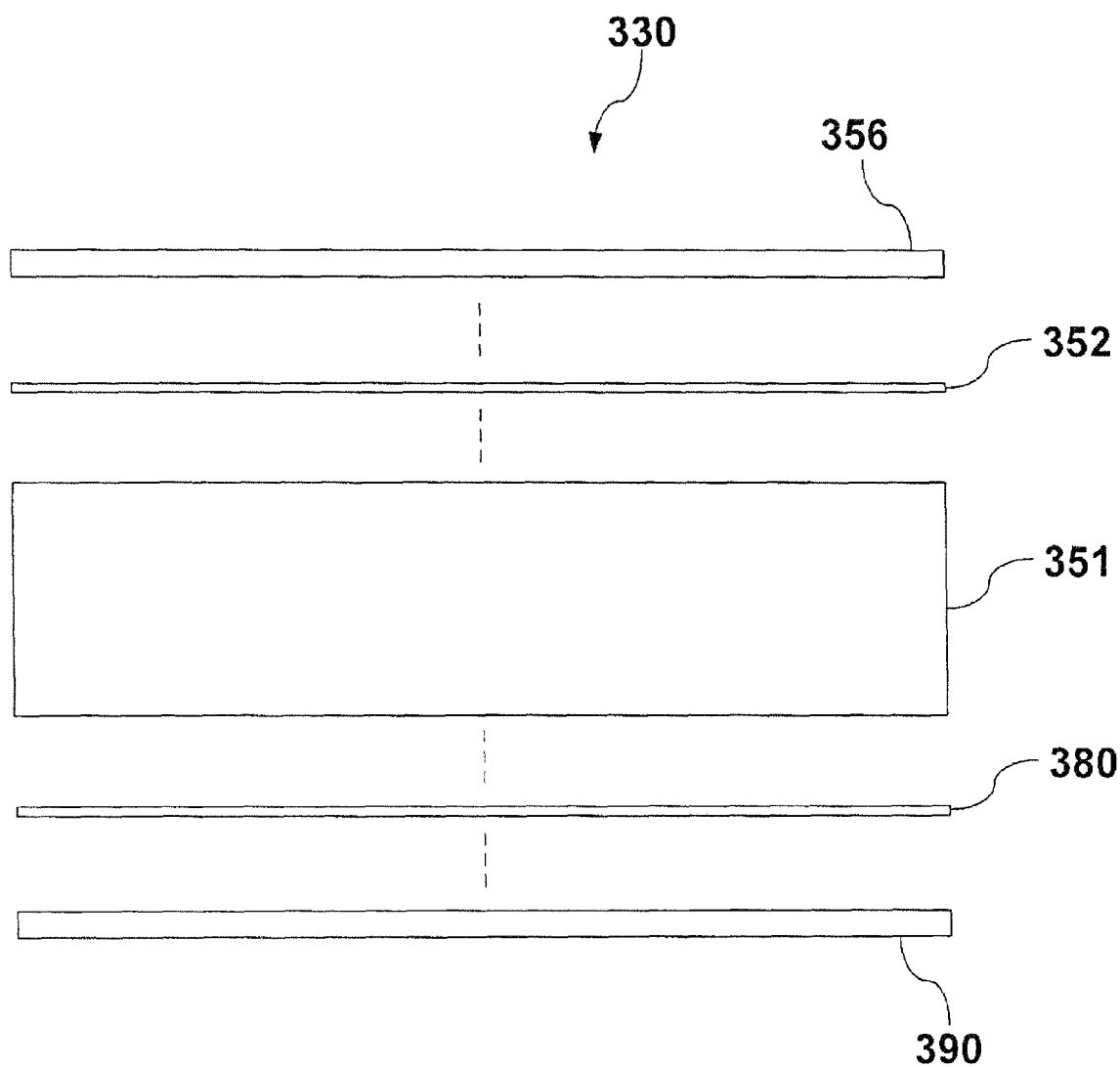
FIG. 7 illustrates an exploded cut-away view of the example gaming station illustrated in FIG. 6.
Figure 8:
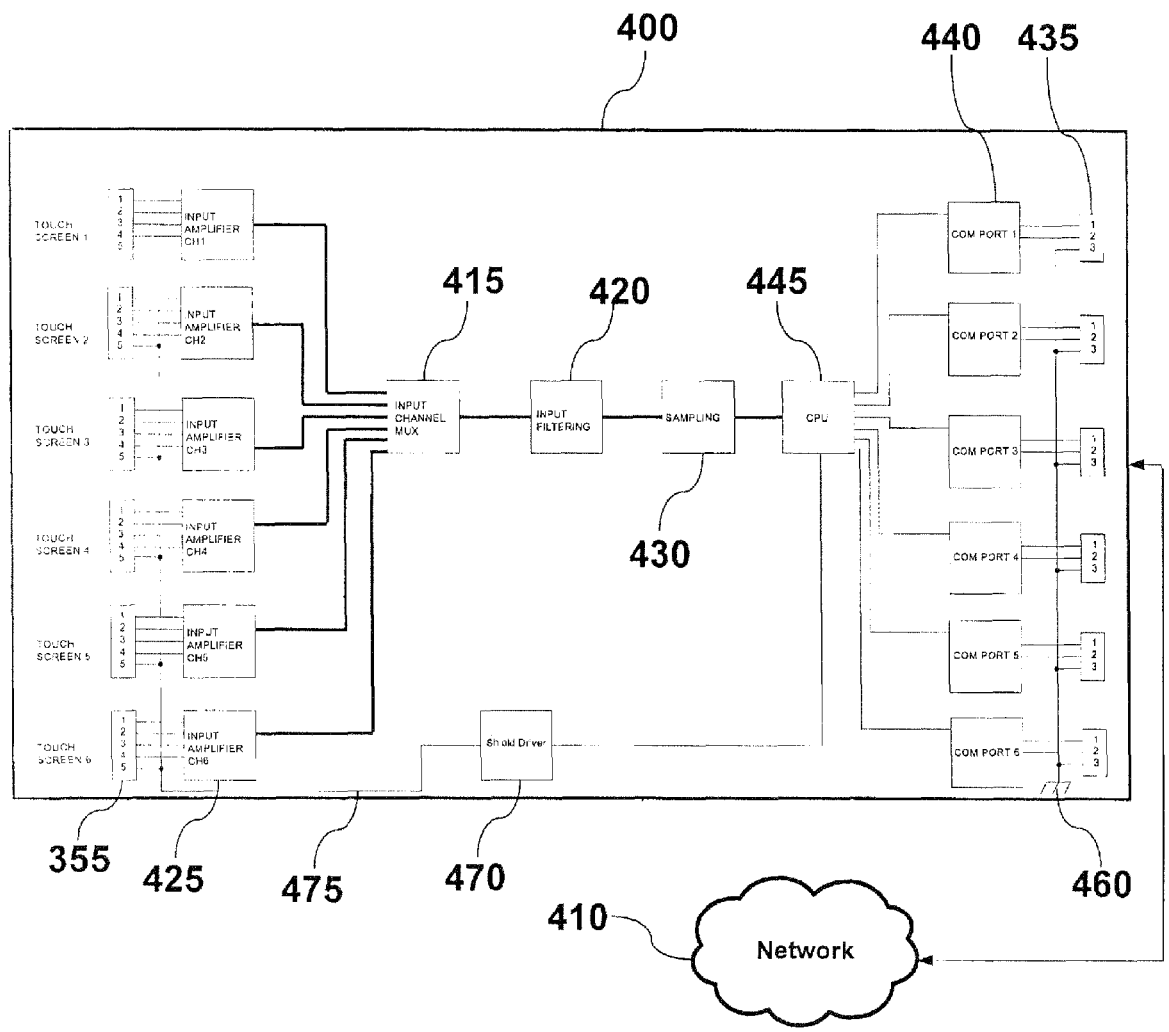
FIG. 8 illustrates a block diagram of a multi-channel touchscreen controller of the example gaining station illustrated in FIG. 7.

FIGS. 6-8 illustrate another embodiment of the present invention. Specifically, FIG. 6 illustrates a plan view of another example gaming station according to another embodiment of the present invention, FIG. 7 illustrates an exploded cut-away view of the example gaming station illustrated in FIG. 6, and FIG. 8 illustrates a block diagram of a multi-channel touchscreen controller of the example gaming station illustrated in FIG. 7.

The embodiments shown in FIGS. 6-8 are similar to the embodiments described with reference to FIGS. 2-4. Therefore, a full description of some of the similar elements shown in both sets of embodiments will be omitted here. Referring to FIGS. 6-8, a monolithic structure 330 includes a substantially transparent monolithic substrate 351, a first conductive coating 352 formed over the monolithic substrate 351, a first protective layer 356 formed over the first conductive coating 352 and monolithic substrate 351, a drive shield conductive coating 380 formed below the monolithic substrate 351, and a second protective layer 390 formed under the second conductive coating 380 and monolithic substrate 351. The first conductive coating 352 and first protective layer 356 may act as touchscreen components in a similar manner as described above with reference to FIGS. 2-4. The second conductive coating 380 may act as a drive shield to protect the first conductive layer 352 from electrical interference from electrical components located below the monolithic structure 330. Like the first conductive coating 352, the second conductive coating 380 preferably includes a substantially transparent conductive material such as indium tin oxide. Additionally, the second conductive coating 380 may be formed of a similar material as the first conductive coating 352 to ease in the manufacturing of the monolithic structure 330.

As shown in FIG. 6, the second conductive coating 380, which may act as a drive shield, may be etched to cover a similar area to the first conductive coating 352 that acts as part of a particular gaming station touchscreen 350 in a gaming device 310. However, the second conductive coating 380 may not be etched at all (i.e., cover substantially all of the bottom surface of the monolithic substrate 351) or be etched in a manner such that it does not cover a similar area to the first conductive coating 352. The second conductive coating 380 may also have an etched trace 388 so that the drive shield conductive coating 380 may be supplied with voltage. The etched trace 388 may extend toward an outside edge of the gaming device (such as outside edge 122 shown in FIGS. 1A and 1B) to be connected to the same flat ribbon wire 355 as the touchscreen sensor traces 358. However, the etched trace 388 may be separate from the flat ribbon wire 355 used for the touchscreen sensor traces 358. As shown in FIG. 8, the etched trace 388 of each shield driver conductive layer 380 may be connected to a shield drive circuit 470 through a shield drive line 475. The shield drive circuit 470 may further be connected to the central processing unit (CPU) 445 of the multi-channel touchscreen controller 400. Additionally, as shown in FIG. 8, the shield drive circuit may be included within the multi-channel touchscreen controller 400. The shield drive circuit 470 may regulate a constant voltage to the shield drive conductive layer 380 so that input touches to the first conductive touchscreen layer 352 can be properly sensed by touchscreen sensors 358 without interference from underlying electronic components. In other embodiments, the shield drive circuit 470 may only provide voltage to the shield drive conductive layer 380 when at least one of the touchscreen conductive layers 352 at a gaming station 350 is activated to receive a touch input. In this embodiment, the CPU 445 may be used to communicate both the touchscreen activation signal and the shield driver activation signal.

In other embodiments where the drive shield of each gaming station touchscreen 350 is electrically connected, only one connection means, through one of the flat ribbon wires 355 or otherwise, is required instead of the individual drive shield connections at each gaming station 350 that is shown in FIG. 8.

Additionally, in other embodiments, the second conductive coating 380 may be used as replacement touchscreen conductive layers. In these embodiments, the second conductive coating 380 may be etched so that it has a substantially similar size, shape, and location to a corresponding touchscreen gaming stations 350 etched from the first conductive coating 352, as shown in FIG. 6. Further, the second conductive coating 380 may be etched such that each etched portion corresponding to a gaming station 350 is electrically isolated from the remainder of the non-etched second conductive coating 380. However, unlike the embodiments illustrated in FIG. 6, the second conductive coating 380 of these embodiments may include a plurality of etched touchscreen sensor traces 388 extending from the etched drive shield/touchscreen portion of the second conductive coating 380 of each gaming station 350 toward the edge of the gaming device 310. During operation where the first conductive coating 352 is acting as a touchscreen lower electrode, only one of the plurality of etched touchscreen sensors 388 may be active such that the second conductive coating 380 behaves as a drive shield. Additionally, two or more of the plurality of etched touchscreen sensor traces 388 may be tied or shorted together such that the second conductive coating 380 behaves as a drive shield.

One advantage of the above embodiments, where the second conductive coating 380 includes a plurality of etched touchscreen sensors 388, is that if one or more of the first conductive coating touchscreen electrodes 352 fails, the monolithic structure 330 may be flipped over and the second conductive coating 380 may be used as touchscreen electrodes, while the first conductive coating 352 may be used as drive shields. Preferably in these embodiments, the second protective layer 390 is disposed over the second conductive layer 380 during the initial manufacturing of the gaming device 310 so that it may be used as the touchscreen dielectric layer once the monolithic structure 330 is flipped over without additional downtime for the gaming device 310. In flipping the monolithic structure 330, the etched touchscreen sensors 358 and 388 may have to be reconnected in a different manner with the flat ribbon wire 355. The flat ribbon wire 355 may additionally be structured to have two rows of pins to accommodate the first conductive coating etched traces 358 and second conductive coating etched traces 388. Thus, in essence, these embodiments could extend the life of the monolithic structure 330 by two times.

Figure 9:
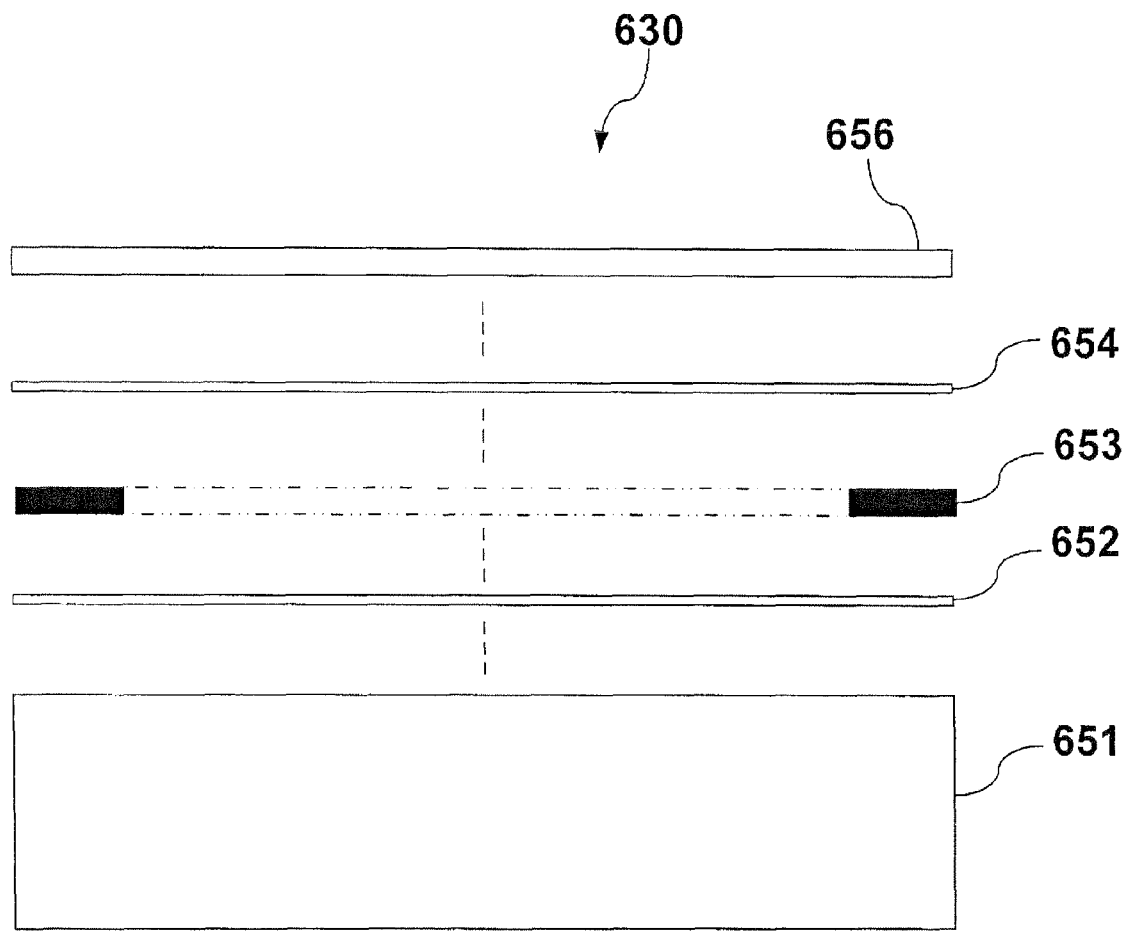
FIG. 9 illustrates an exploded cut-away view of yet another example gaming station according to yet another embodiment of the present invention.

FIG. 9 illustrates an exploded cut-away view of yet another example gaming station according to yet another embodiment of the present invention. The embodiment illustrated in FIG. 9 may be representative of a resistive touchscreen setup rather than a capacitive touchscreen setup. Referring to FIG. 9, a monolithic structure 630 may include a monolithic substrate 651, a conductive coating 652 formed over the monolithic substrate 651, a spacer layer 653 formed over the monolithic substrate 651 and conductive coating 652, a resistive coating 654, and a protective layer 656 to seal the top of the monolithic structure 630.

The monolithic substrate 651 may be similar to the monolithic substrate described above with respect to FIGS. 2 and 3. The conductive coating 652 may also be similar to the conductive coating described above with respect to FIGS. 2 and 3. That is, the conductive coating 652 may include a substantially transparent conductive material such as indium tin oxide with a surface resistance of about 200 to about 2000 ohms per square. The isolation spacer 153 may include a thin plastic film with specific portions cut away, which are referred to as void portions or cut-out portions. The isolation spacer 653 may be used to separate the conductive coating 652 on the monolithic substrate 651 from the resistive coating 654. Thus, by using an isolation spacer 653, a relatively small pocket of air may be formed between the conductive and resistive coatings 652, 654 where the portions of the plastic film of the isolation spacer 653 are cut away (i.e., in the void portions of the isolation spacer). As air acts as an insulator, substantially no current is passed between the conductive and resistive coatings 652, 654. As described in more detail below, touches are detected and recorded when the conductive and resistive coatings 652, 654 come into contact with each other through a touch. Thus, the isolation spacer 653 may only have void portions cut out where touchscreens are to be located.

Additionally, the resistive coating 654 may be coated on the bottom surface of the protective layer 656. The resistive coating 654 may preferably be etched so that its shape and size correspond with the shape and size of the conductive coating 652 and the void portions of the isolation spacer 653. The protective layer 656 may be a continuous piece of thin glass or plastic. The protective layer 656 is preferably flexible so that a force from a finger or stylus pushing on it will flex it at that particular portion so that the resistive layer 654 corresponding to that pushed portion contacts the conductive layer 652 at a location corresponding to the force. Although a shield drive layer (i.e., a second conductive layer formed on the bottom of the monolithic substrate 651) may reduce some electrical interference, it is not as preferable as it is with capacitive touchscreens because resistive touchscreens determine a touch through the contact of two layers rather than from capacitive current drawing calculations.

In operation, a player can use their finger or a stylus to lightly press the outside protective layer 656. As the protective layer 656 is not completely rigid, it flexes inward at the location of the input touch such that the resistive layer 654 comes into contact with the conductive layer 652. This contact causes a change in the electrical field generated in the conductive layer, which can be noted by touchscreen sensors. In particular, the touchscreen sensors and controller can determine the coordinates of the touch based on the change in the electrical field.

Figure 10:
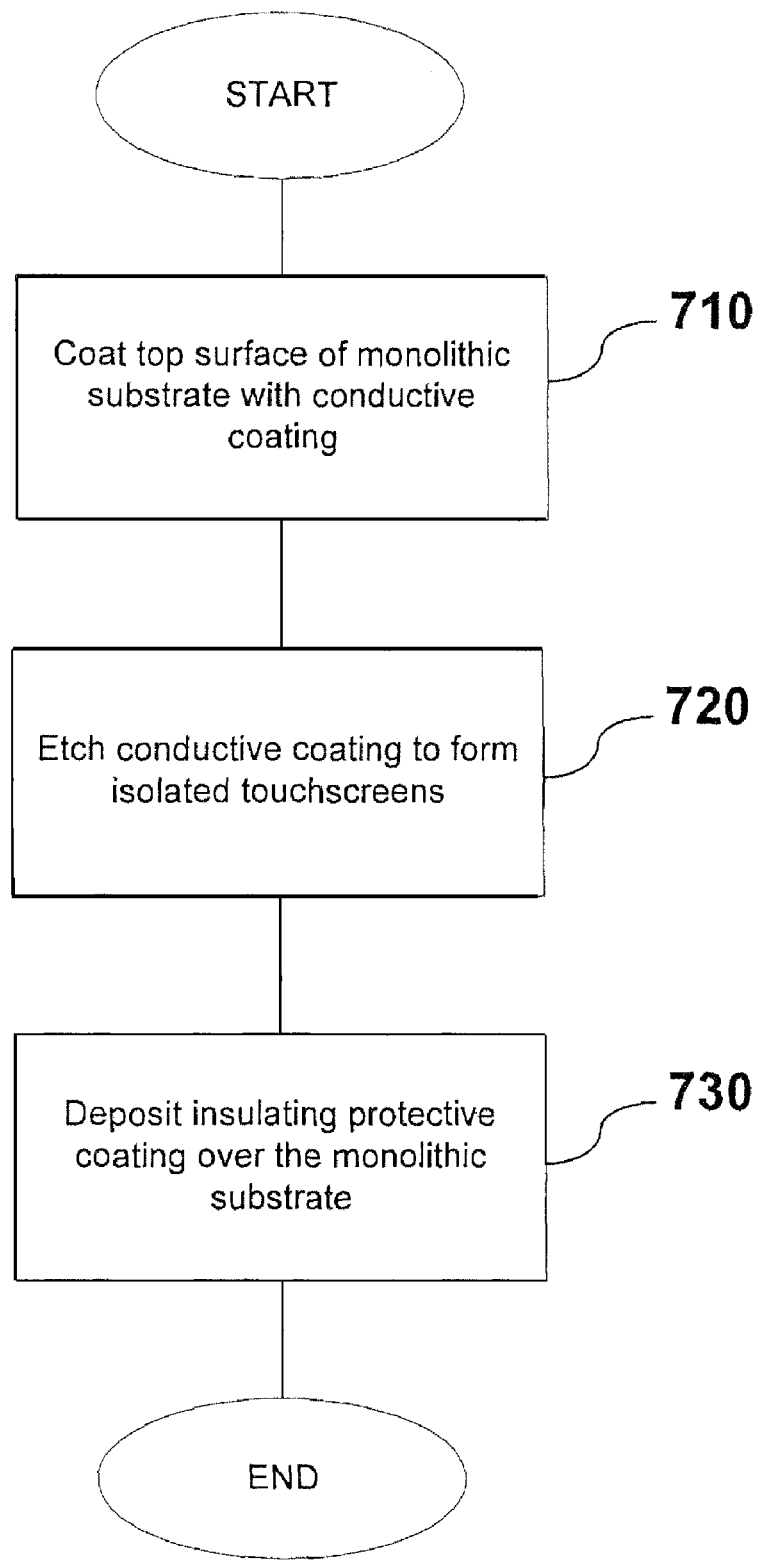
FIG. 10 illustrates a flow chart of a method of forming a multi-touchscreen monolithic structure according to an embodiment of the present invention.
Figure 11:
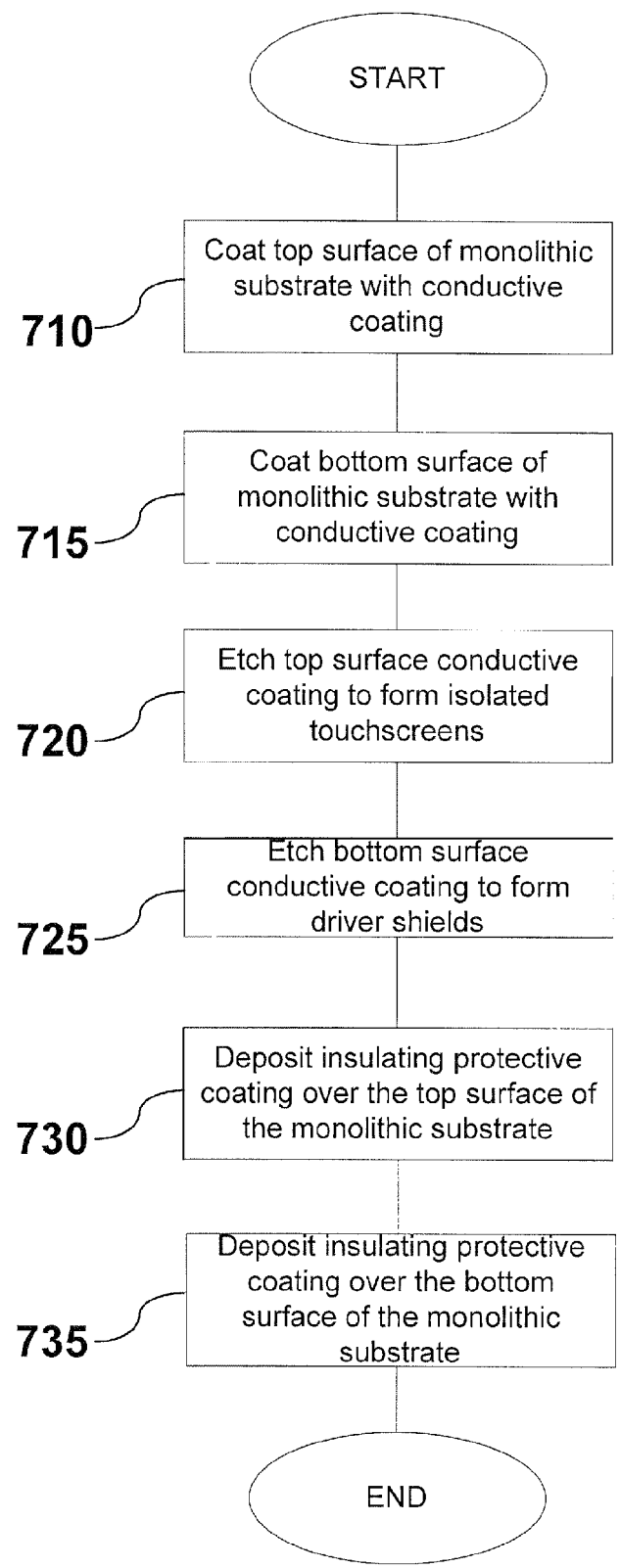
FIG. 11 illustrates a flow chart of another method of forming a multi-touchscreen monolithic structure according to another embodiment of the present invention.
Figure 12:
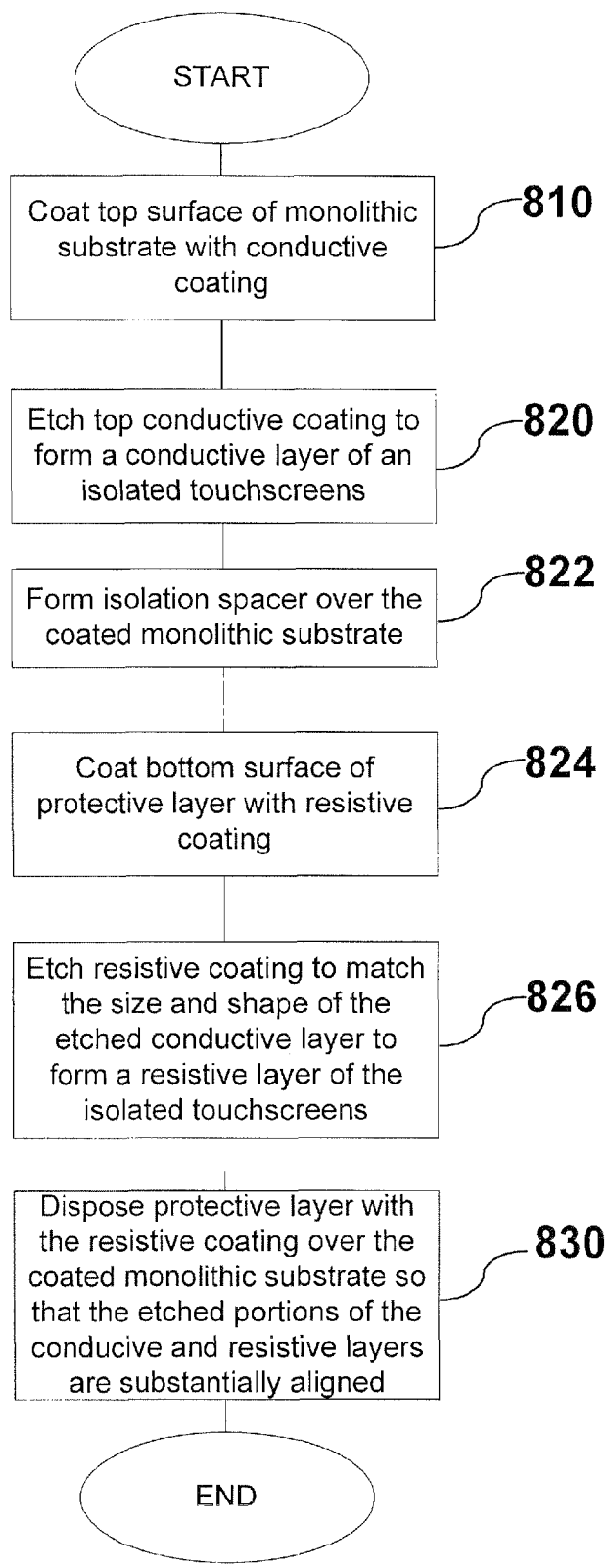
FIG. 12 illustrates a flow chart of yet another method of forming a multi-touchscreen monolithic structure according to yet another embodiment of the present invention.

FIGS. 10-12 illustrate methods of forming a multi-touchscreen monolithic structure according to several embodiments. FIG. 10 illustrates a flow chart of a method of forming a multi-touchscreen monolithic structure according to an embodiment of the present invention. Referring to FIGS. 10 and 3, a top surface of a monolithic substrate 151 is coated with a conductive coating 152 (step 710). The conductive coating 152 on the top surface of the monolithic substrate 151 is then etched to form electrically isolated touchscreen conductive layers (step 720). After the conductive coating 152 has been etched, an insulating protective layer 156 is deposited over the monolithic substrate 151 having the etched conductive coating 152 (step 730).

In some embodiments, the conductive coating 152 may be deposited on the monolithic substrate 151 through an evaporation process in a vacuum oven. However, in other embodiments, the conductive coating 152 may be deposited on the monolithic substrate 151 through chemical vapor deposition (CVD), physical vapor deposition (PVD), sputtering, or other thin film deposition techniques.

In some embodiments, the conductive coating may be etched with a laser to form the electrically isolated touchscreen portions of the conductive coating 152 and the touchscreen sensor traces (158 in FIG. 2). In these embodiments, a thin portion of conductive coating 152 may be etched around the isolated touchscreen portion and touchscreen sensor traces 158 to electrically isolate them from the remainder of the gaming stations (150 in FIG. 1A). Therefore, unetched portions of the conductive coating 152 that are not electrically connected to any of the gaming stations 150 may remain on the monolithic substrate 151. Alternatively, all or substantially all of the conductive coating not used in the touchscreens of the gaming stations 150 may be etched away.

In other embodiments, the conductive coating may be etched with the use of an etch mask. In these embodiments, a resistive etch material (not shown) may be silkscreened over the conductive coating 152 on the top surface of the monolithic layer 151. The silkscreened resistive etch material may be formed so as to cover portions of the conductive coating 152 to be used in the touchscreen and touchscreen sensor 158 portions. Thus, the resistive etch material may act as an etch mask. After the resistive etch material has been silkscreened, an etching process is performed to remove the exposed conductive coating 152. This etching process may include a dry etch or a wet chemical etch. After the etching process has been completed, the resistive etch material is removed.

Although the conductive layer etching is generally done to provide a known electrical field in which a touch location may be calculated, in some embodiments, a tuning process where the touchscreen electrode or sensors may be further modified may be performed. In a tuning process, the capacitive layer electrode or sensors may be scraped or abraded away to linearize the touchscreens' detection characteristics within desired parameters.

In some embodiments, the protective layer 156 may be deposited on the monolithic substrate 151 in a vacuum oven. Additionally, in some embodiments, after the protective layer 156 is deposited on the monolithic substrate 151 having the etched conductive coating 152, a sealing process is performed to seal the edges of the monolithic structure 130 so that air and liquids do not permeate or interfere with the electrical operation of the touchscreens on the monolithic structure 130.

FIG. 11 illustrates a flow chart of another method of forming a multi-touchscreen monolithic structure according to another embodiment of the present invention. Referring to FIGS. 11 and 7, the method or forming a first conductive coating 352 on a top surface of a monolithic substrate 351 (step 710), etching the first conductive coating 352 on the top surface of the monolithic substrate 351 (step 720), and depositing a protective layer over the monolithic substrate 351 having the etched first conductive coating 352 (step 730) may be similar to the embodiment illustrated in FIG. 10. However, the embodiment illustrated in FIG. 11 further includes forming a second conductive coating 380 on the bottom surface of the monolithic substrate 351 (step 715), etching the second conductive layer 380 on the bottom surface of the monolithic substrate 351 (step 725), and depositing a second protective layer 390 over the bottom surface of the monolithic substrate 351 having the etched second conductive layer 380 (step 735).

The formation of the second conductive coating 380 on the bottom surface of the monolithic substrate 351 may be performed in a similar manner to the formation of the first conductive coating 352 on the top surface of the monolithic substrate 351, although the second conductive coating 380 may be formed by a different process than the first conductive coating 352. In some embodiments, the first conductive coating 352 and the second conductive coating 380 may be formed at the same time on the surfaces of the monolithic substrate 351. Further, as the first and second conductive coatings 352, 380 may include a similar material, the first and second conductive coatings 352, 380 may be formed in the same thin film deposition process.

As discussed above, the second conductive coating 380 may be used as a drive shield to prevent electrical interference with the operation of the touchscreen from electrical components located below the touch screen. Thus, as illustrated in FIG. 6, the second conductive coating may be etched to be of similar size to the first conductive touchscreen layer 352. However, in other embodiments, the second conductive coating may only have a relatively small portion etched or no portion etched at all. Unlike the touchscreens formed with the first conductive layer 352, the drive shields using the second conductive layer 380 do not necessarily have to be electrically isolated from each other. However, the drive shields formed with the second conductive layer 380 may still require an electrical connection through an etched trace (388 in FIG. 6) so that an electrical voltage can be supplied to the drive shield. Thus, even if the majority of the second conductive coating 380 remains as one large drive shield, a portion of the second conductive coating 380 may be etched to form one or more etched electrical traces 388. In addition, the second conductive coating 380 may be etched using similar etching processes as those described above with respect to etching the first conductive coating 352.

The second protective layer 390 may be deposited in a similar manner to the first protective layer 356. However, in some embodiments, the second protective layer 390 may be omitted because the bottom surface of the monolithic structure 330 will generally not be exposed during normal functioning of the gaming device (110 in FIG. 1A). As mentioned above, the second protective layer 390 may still be preferable as it will help prevent scratches or mars to the second conductive coating drive shield 380 that may occur during manufacturing or assembly of the gaming device 110 or during maintenance of the gaming device 10.

FIG. 12 illustrates a flow chart of yet another method of forming a multi-touchscreen monolithic structure according to yet another embodiment of the present invention. Referring to FIGS. 12 and 9, the method may include coating a top surface of a monolithic substrate 651 with a conductive coating 652 (step 810), etching the conductive coating 352 to form isolated touchscreens (step 820), forming an isolation spacer layer 653 over the monolithic substrate 651 having the etched conductive coating 652 (step 822), coating the bottom surface of a protective layer 656 with a resistive coating 654 (step 824), etching the resistive coating 654 to match the size and shape of the etched conductive layer 652 (step 826), and disposing the protective layer 656 having the etched resistive coating 654 over the monolithic substrate 651 having the conductive coating 652 and isolation spacer layer 653 (step 830) such that the etched portions of the conductive and resistive layers are substantially aligned.

The coating processes of the conductive and resistive coatings 652, 654 may be carried out by one or more of the evaporation or thin film deposition processes described above with respect to the embodiment illustrated in FIG. 10. The protective layer 656 may be deposited in a similar manner to the deposition of the protective layer illustrated in FIG. 10. The isolation spacer 653 may have the cut-out portions of it removed prior to depositing it on the monolithic substrate 651 having the conductive coating 652, or it may have the cut-out portions of it removed after it is deposited.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A gaming device comprising:
    a base structure;
    an upper structure mounted on the base structure, the upper structure arranged to define a layout of gaming stations;
    a plurality of gaming displays respectively disposed at each of the gaming stations;
    a substantially transparent monolithic substrate arranged over the upper structure to cover at least the plurality of gaming displays;
    an electrically conductive coating formed on the monolithic substrate over at least the plurality of gaming displays, wherein the electrically conductive coating comprises a plurality of electrically isolated portions, wherein each isolated portion includes at least one touchscreen sensor formed at an edge of the isolated portion such that the conductive coating over each of the gaming displays is electrically isolated from the remainder of the conductive coating;
    a protective layer formed over the conductive coating and monolithic substrate, the protective layer having a substantially planar surface; and
    a bottom drive shield coating formed on a bottom surface of the monolithic substrate, wherein the bottom drive shield coating comprises a plurality of electrically isolated drive shields configured to protect the conductive coating from electrical interference.

2. The gaming device of claim 1, wherein the monolithic substrate includes optically clear glass.

3. The gaming device of claim 1, wherein the protective layer includes silicon dioxide.

4. The gaming device of claim 1, wherein the conductive coating includes indium tin oxide.

5. The gaming device of claim 1, wherein the bottom drive shield is formed to overlap at least each of the gaming displays.

6. The gaming device of claim 1, wherein the plurality of electrically isolated drive shields each correspond to a respective isolated portion of the conductive coating.

7. The gaming device of claim 1, wherein the plurality of electrically isolated drive shields are etched from the bottom drive shield coating such that they may be used as touchscreen electrodes.

8. The gaming device of claim 1, further comprising a bottom protective layer formed over the bottom drive shield coating.

9. The gaming device of claim 8, wherein the bottom drive shield includes indium tin oxide and wherein the bottom protective layer includes silicon dioxide.

10. The gaming device of claim 1, further comprising:
    a resistive pattern formed on the bottom surface of the protective layer; and
    an isolation spacer disposed between the monolithic substrate and the protective layer such that the conductive coating on the monolithic substrate is isolated from the resistive pattern on the protective layer, the isolation spacer including void portions disposed over each of the gaming displays.

11. A multi-station gaming device comprising:
    a table-like playing surface having a plurality of gaming terminals, each gaming terminal including a gaming display device;
    a monolithic layer having a substantially planar upper surface arranged over the table-like playing surface, the monolithic layer including a plurality of electrically isolated touchscreens that are each substantially coplanar with the table-like playing surface and that are each respectively positioned over each of the gaming display devices; and
    a plurality of shield drives that are each connected to a respective isolated touchscreen and that are each configured to protect the respective isolated touchscreen from electrical interference.

12. The gaming device of claim 11, further comprising a plurality of touchscreen sensors respectively associated with each of the isolated touchscreens.

13. The gaming device of claim 12, further including a plurality of touchscreen controllers, where each of the isolated touchscreens is respectively connected to one of the touchscreen controllers.

14. The gaming device of claim 12, further comprising a multi-screen touchscreen controller, where each isolated touchscreen is connected to the multi-screen touchscreen controller.

15. The gaming device of claim 14, wherein the multi-screen touchscreen controller is a multi-channel touchscreen controller, the multi-channel touchscreen controller including:
    a processor;
    a sampling circuit connected to the processor;
    an input filter circuit connected to the sampling circuit;
    a plurality of input amplifiers respectively connected to the plurality of isolated touchscreens; and
    an input channel switching device connected to each of the input amplifiers and the input filter circuit, where the input channel switching device selects one of the input amplifiers to connect to the input filter circuit.

16. The gaming device of claim 15, wherein each of the drive shields is driven by the central processor.

17. The gaming device of claim 15, wherein the multi-channel touchscreen controller further includes a plurality of communication ports connected to the central processor for communicating with a gaming network.

18. The gaming device of claim 17, wherein the central processor communicates to a server based gaming controller over the gaming network.

19. A method of forming a multi-touchscreen monolithic layer, the method comprising:
    coating, by a vacuum oven, a top surface of a monolithic substrate with a substantially transparent conductive material;
    coating a bottom surface of the monolithic substrate with a resistive coating;
    etching the substantially transparent conductive material to form a plurality of electrically isolated portions of the conductive material, where each isolated portion includes at least one touchscreen sensor formed at an edge of the isolated portion;
    etching the resistive coating to substantially match the shape of the isolated portions to form a plurality of drive shields substantially aligned with respective isolated portions; and
    depositing an insulating protective coating over the monolithic substrate such that multi-touchscreen monolithic layer has a substantially smooth upper surface.

20. The method of claim 19, wherein etching the substantially transparent conductive material includes electrically isolating portions of the substantially transparent conductive material and electrically isolating components necessary to form the at least one touchscreen sensor with an etching laser.

21. The method of claim 19, wherein etching the substantially transparent conductive material includes:
   forming a mask layer over the substantially transparent conductive material, the mask layer formed to exposed portions of the substantially transparent conductive material to be etched;
   etching the exposed portions of the substantially transparent conductive material; and
   removing the mask layer from the substantially transparent conductive material.

22. The method of claim 19, further comprising:
   forming an isolation layer on the coated monolithic substrate before depositing the protective coating, the isolation layer having void portions corresponding to electrically isolated conductive layer portions.

* * * * *